United States Patent [19]

Saeman

[11] 4,348,371

[45] Sep. 7, 1982

[54] PROCESS FOR THE RECOVERY OF CALCIUM SALTS FROM CALCIUM HYPOCHLORITE PROCESS EFFLUENTS

[75] Inventor: Walter C. Saeman, Cleveland, Tenn.

[73] Assignee: Olin Corporation, New Haven, Conn.

[21] Appl. No.: 260,641

[22] Filed: May 4, 1981

[51] Int. Cl.$^3$ ................. C01B 11/14; C01F 11/24
[52] U.S. Cl. ................................. 423/475; 423/497; 23/304
[58] Field of Search ............... 423/473–476, 423/497, 499; 23/304

[56] References Cited

U.S. PATENT DOCUMENTS

| | | | |
|---|---|---|---|
| 1,660,053 | 2/1928 | Smith | 423/497 |
| 1,949,204 | 2/1934 | Heath | 23/304 |

FOREIGN PATENT DOCUMENTS

| | | | |
|---|---|---|---|
| 617778 | 2/1949 | United Kingdom | 423/497 |
| 1124414 | 8/1968 | United Kingdom | 423/497 |
| 311866 | 2/1970 | U.S.S.R. | 423/497 |

Primary Examiner—Earl C. Thomas
Attorney, Agent, or Firm—James B. Haglind; Donald F. Clements

[57] ABSTRACT

A process for the recovery of calcium chloride hydrates and calcium chlorate compounds comprises:

(a) blending an effluent comprised of an aqueous solution of calcium chloride, calcium chlorate, and calcium hypochlorite and having a weight ratio of $Ca(ClO_3)_2/CaCl_2$ of less than about 0.2 with a second mother liquor comprised of an aqueous solution of calcium chlorate and calcium chloride and having a weight ratio of $Ca(ClO_3)_2/CaCl_2$ of greater than about 1.0 to form a blended solution;

(b) feeding the blended solution to a first crystallizer to form a slurry of calcium chloride hydrate in a first mother liquor;

(c) separating the crystals of calcium chloride hydrate from the first mother liquor, the first mother liquor having a weight ratio of $Ca(ClO_3)_2/CaCl_2$ of at least about 1.0;

(d) feeding the first mother liquor to an evaporative crystallizer to form a crystalline calcium chlorate compound;

(e) separating the crystalline calcium chlorate compound from a second mother liquor;

(f) recovering the crystalline calcium chlorate compound; and (g) returning the second mother liquor to step (a).

12 Claims, 4 Drawing Figures

PROCESS FOR THE RECOVERY OF CALCIUM SALTS FROM CALCIUM HYPOCHLORITE PROCESS EFFLUENTS

This invention relates to the manufacture of calcium hypochlorite products. More specifically, the invention relates to the recovery of calcium salts from effluents produced in the manufacture of calcium hypochlorite products.

Calcium hypochlorite is a well known commercial product employed as a disinfectant and sanitizer in, for example, water bodies such as swimming pools. It can be produced in various forms including neutral calcium hypochlorite $Ca(OCl)_2$, hemibasic calcium hypochlorite $Ca(OCl)_2 \cdot \frac{1}{2} Ca(OH)_2$, and dibasic calcium hypochlorite $Ca(OCl)_2 \cdot 2Ca(OH)_2$. Processes for producing each of these forms are described, for example, in Kirk-Othmer's Encyclopedia of Chemical Technology, 3rd Ed., Vol. 5, 599–602, John Wiley & Sons, 1979. In producing hemibasic hypochlorite and dibasic hypochlorite, a slurry of lime is chlorinated to produce hypochlorite crystals which are separated from a filtrate. The filtrate, containing substantial amounts of calcium chloride, moderate amounts of calcium hypochlorite as well as calcium chlorate, may be subsequently treated with additional lime to recover a portion of the dissolved hypochlorite remaining in the filtrate. It has been the practice to discard the remaining portion of the filtrate as described, for example, in U.S. Pat. No. 2,374,835, issued May 1, 1945 to H. L. Robson or U.S. Pat. No. 3,030,177, issued Apr. 17, 1962 to J. C. Mohan, Jr. In addition to the economic loss resulting from the discarding of the filtrate containing calcium salts, this procedure is now prohibited as it poses an environmental hazard, if, for example, these solutions are added to public waterways such as rivers and streams.

Thus, there is a need for a process for recovering calcium salts such as calcium chloride and calcium chlorate from effluents produced during the production of hemibasic and dibasic hypochlorite which is economical and which poses no pollution problem.

An object of the present invention is to provide a process for the recovery of calcium salts from aqueous effluents obtained in the production of calcium hypochlorite.

Another object of the present invention is to provide a process in which the disposal of waste solutions poses no pollution problem.

These and other objects of the invention are accomplished in a process for the recovery of calcium chloride hydrates and calcium chlorate and its hydrates from calcium hypochlorite process effluents which comprises:

(a) blending an effluent comprised of an aqueous solution of calcium chloride, calcium chlorate, and calcium hypochlorite and having a weight ratio of $Ca(ClO_3)_2/CaCl_2$ of less than about 0.2 with a second mother liquor comprised of an aqueous solution of calcium chlorate and calcium chloride and having a weight ratio of $Ca(ClO_3)_2/CaCl_2$ of greater than about 1.0, to form a blended solution;

(b) feeding the blended solution to a first crystallizer to form a slurry of calcium chloride hydrate in a first mother liquor;

(c) separating the crystals of calcium chloride hydrate from the first mother liquor, the first mother liquor having a weight ratio of $Ca(ClO_3)_2/CaCl_2$ of at least about 1.0;

(d) feeding the first mother liquor to an evaporative crystallizer to form a crystalline calcium chlorate compound;

(e) separating the crystalline calcium chlorate compound from a second mother liquor;

(f) recovering the crystalline calcium chlorate compound; and (g) returning the second mother liquor to step (a).

More in detail, the novel process of the present invention is illustrated by the following FIGURES.

Figure 1:
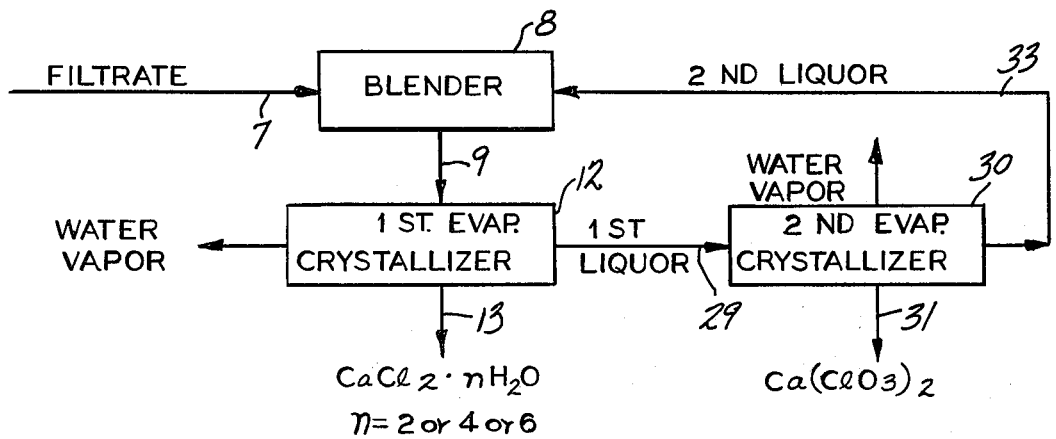
FIG. 1 represents a flow diagram of one embodiment of the process of the present invention.

In the flow diagram represented in FIG. 1, an aqueous filtrate from a hemibasic hypochlorite or dibasic hypochlorite process comprised of calcium chloride, calcium hypochlorite, and minor amounts of calcium chlorate is fed through line 7 to blender 8 where it is blended with calcium chlorate mother liquor fed to blender 8 through line 33. The blended solution passes through line 9 to first evaporative crystallizer 12. Crystallizer 12 is operated under vacuum and temperature conditions which produce crystalline calcium chloride dihydrate, calcium chloride tetrahydrate, or calcium chloride hexahydrate or mixtures thereof. The crystalline calcium chloride hydrate is separated from a first mother liquor and recovered through line 13. The first mother liquor is fed through line 29 to second evaporative crystallizer 30. Second evaporative crystallizer 30 is operated under vacuum and temperature conditions which will produce anhydrous crystalline calcium chlorate or crystalline calcium chlorate dihydrate or mixtures thereof. Crystals of the calcium chlorate product are separated from a second mother liquor and recovered through line 31. The second mother liquor is fed to blender 8 through line 33.

Figure 2:
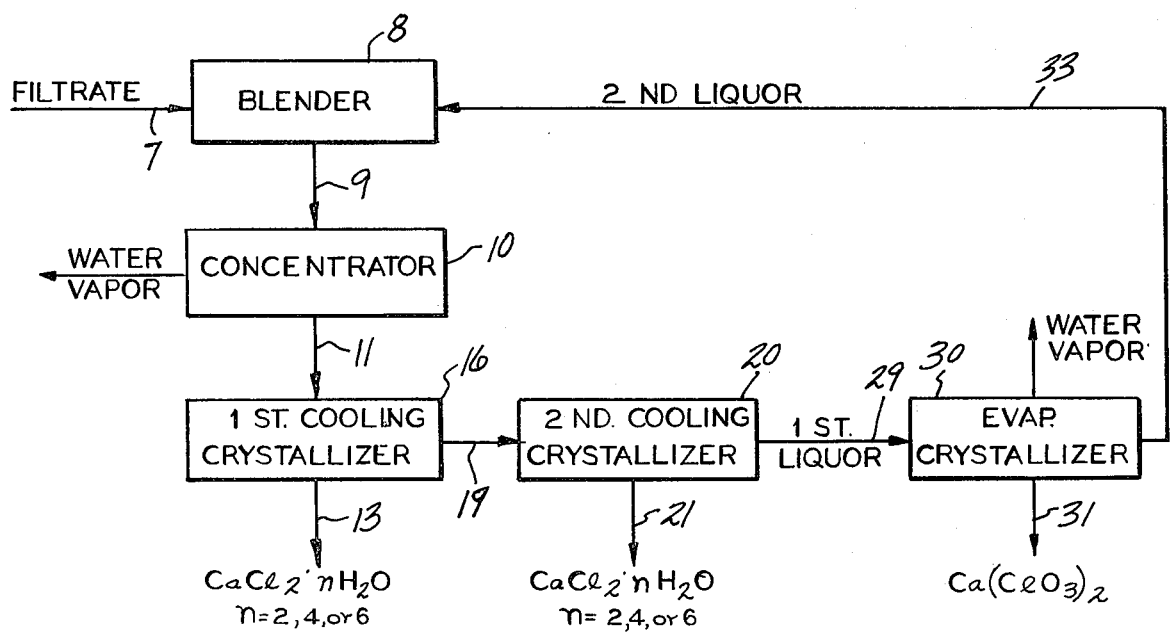
FIG. 2 depicts a flow diagram of an additional embodiment of the process of the present invention.
Figure 3:
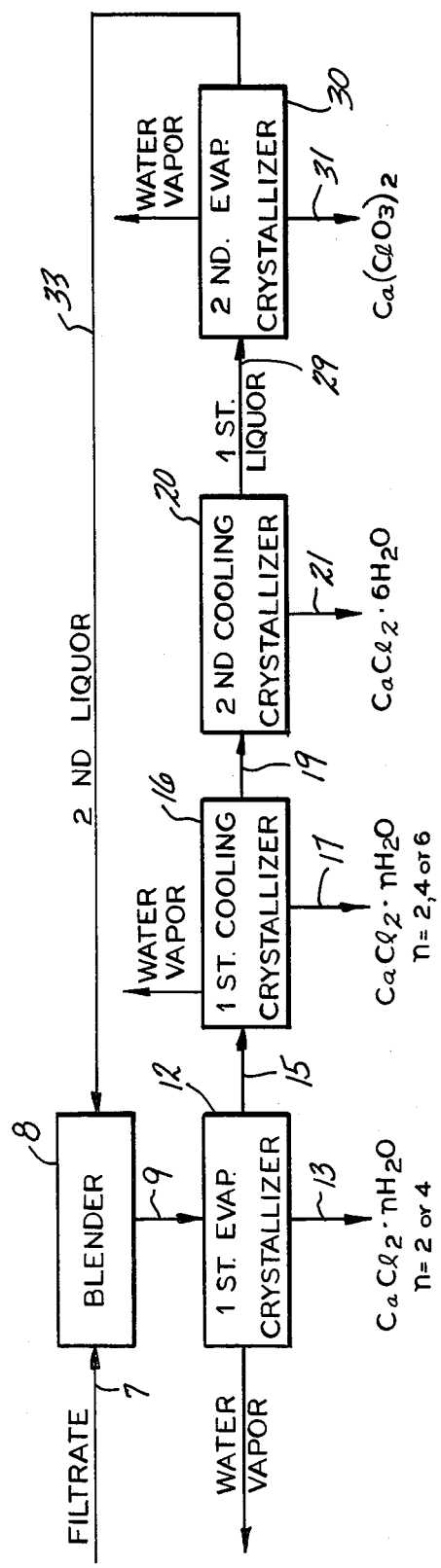
FIG. 3 represents a flow diagram of a further embodiment of the process of the present invention.

Of the various embodiments of the novel process of the present invention illustrated in FIGS. 1–3, in its simplest form, as shown in FIG. 1, the process can be practiced in two sequential evaporative crystallization stages. In the process of FIG. 1, blending and heating of the calcium chloride effluent and the calcium chlorate mother liquor can be combined in the first evaporative crystallization stage from which the excess water is evaporated and in which conditions are also maintained for conversion of the residual $Ca(OCl)_2$ to $Ca(ClO_3)_2$. This simplified arrangement is usable primarily for the recovery of the $CaCl_2$ in the dihydrate or the tetrahydrate crystalline form. Disadvantages inherent in the simple 2-stage evaporative crystallization process are increased evaporative costs for removal of excess water and a reduced rate of $CaCl_2$ crystal production as compared to embodiments illustrated in FIGS. 2 and 3.

As shown in FIG. 2, when calcium chloride dihydrate or tetrahydrate is the desired product, the blended solution formed in blender 8 is introduced into concentrator 10 where it is heated to evaporate water and concentrate the blended solution. Through line 11 the concentrated blended solution is fed to first cooling crystallizer 16. A crystalline slurry is formed in first cooling crystallizer 16 and crystals of a calcium chloride hydrate recovered through line 13. A saturated solution of calcium chloride is fed from first cooling crystallizer 16 to second cooling crystallizer 20. The saturated solution is further cooled to form calcium chloride hydrate crystals which are separated from a first calcium chlorate mother liquor and recovered through line 21. The first calcium chlorate mother liquor is fed through line 29 to evaporative crystallizer 30 in which crystalline calcium chlorate product is produced, separated from a second calcium chlorate mother liquor and recovered through line 31. The second calcium chlorate mother liquor is recycled to blender 8 through line 33.

In the process illustrated in FIG. 2, a separate step is provided for evaporation of the bulk of the water. One or more cooling stages for crystal separation can then be used with suitably concentrated feed solutions. In this case, heating, blending, water evaporation and conversion of the $Ca(OCl)_2$ to $Ca(ClO_3)_2$ can all be combined in the evaporation stage to achieve the best fuel economy for evaporation of water while an enhanced crystallization rate is attained by using sequential stages of cooling crystallization with the temperature of each sequential crystallization stage progressively lower than the preceding stage.

FIG. 3 represents a flow diagram of a further embodiment of the process of the present invention in which the filtrate is fed through line 7 to blender 8 where it is admixed with recycled second calcium chlorate mother liquor. The blended solution formed is fed through line 9 to first evaporative crystallizer 12. Crystallizer 12 is maintained at vacuum and temperature conditions under which crystals of calcium chloride dihydrate or calcium chloride tetrahydrate form. Crystals of the dihydrate or tetrahydrate of calcium chloride are recovered through line 13. A saturated calcium chloride solution is passed through line 15 to first cooling crystallizer 16. First cooling crystallizer 16 is maintained under vacuum and temperature conditions which evaporatively cool the calcium chloride solution to produce crystals of the desired calcium chloride hydrate. The crystals are separated from a cooled calcium chloride solution and recovered through line 17. The cooled calcium chloride solution is fed through line 19 to second cooling crystallizer 20. In second cooling crystallizer 20, non-evaporative cooling is applied to the calcium chloride solution to produce crystals of calcium chloride hexahydrate. The crystals are separated from a first calcium chlorate mother liquor and recovered through line 21 while the first mother liquor is fed through line 29 to second evaporative crystallizer 30. A crystalline calcium chlorate product is formed, separated from a second calcium chlorate mother liquor and recovered through line 31. Second calcium chlorate mother liquor is recycled through line 33 to blender 8.

In the process illustrated by FIG. 3, staged cooling crystallizers are of advantage where the terminal stage of cooling requires refrigeration to attain the highest concentration of $Ca(ClO_3)_2$ in the mother liquor in relation to the residual $CaCl_2$ since the preceding cooling stage can then be operated at a higher temperature with a reduced requirement for refrigerated cooling.

Cooling requirements also vary in conformity with the degree of hydration of the crystalline product produced.

Figure 4:
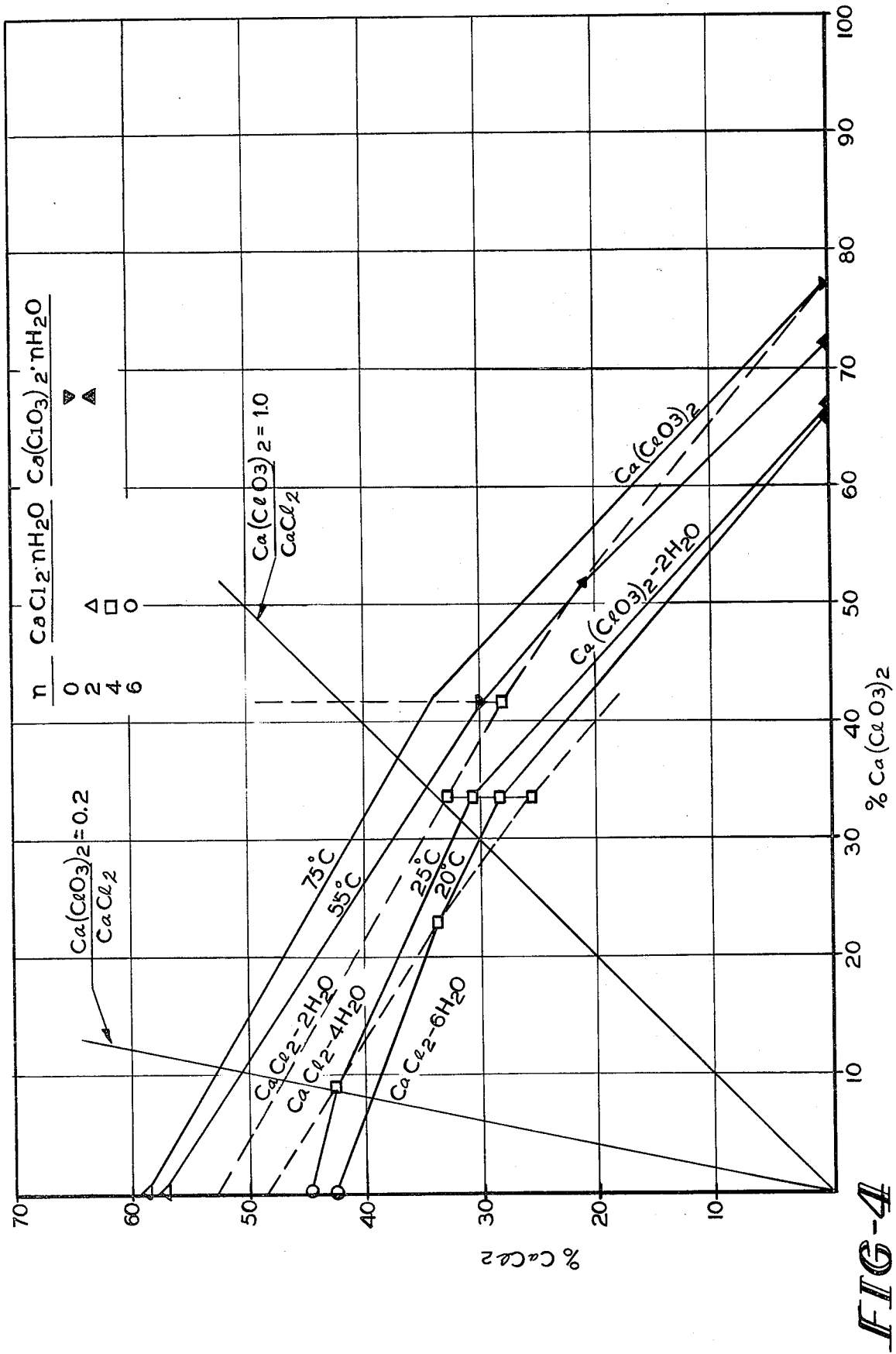
FIG. 4 illustrates a phase diagram for the system $CaCl_2\text{-}Ca(ClO_3)_2\text{-}H_2O$ in which the solid phases for calcium chloride hydrates and calcium chlorate and calcium chlorate dihydrate are depicted.

FIG. 4 illustrates a phase diagram for the system $CaCl_2$-$Ca(ClO_3)_2$-$H_2O$ in which the concentrations of saturated solutions are shown with temperature as a parameter.

The effluent from a hemibasic hypochlorite or dibasic hypochlorite process is an alkaline aqueous solution comprised of calcium chloride with small amounts of calcium hypochlorite and calcium chlorate. Alkali metal compounds such as sodium chloride are not present in the filtrates in significant amounts. The effluent filtrate is neutralized or made slightly acidic by the addition of an acid such as hydrochloric acid. Neutralization of the waste stream also partially converts any calcium hypochlorite present to calcium chlorate. The neutralized waste stream has a $$\frac{CaClO_3}{CaCl_2}$$

weight ratio of less than 0.2.

Calcium hypochlorite present in the neutralized effluent filtrate is converted to calcium chlorate and calcium chloride by heat in accordance with the following equation:

$$3Ca(OCl)_2 \xrightarrow{\Delta} Ca(ClO_3)_2 + 2CaCl_2 \qquad (1)$$

This conversion may take place by heating the filtrate prior to blending, during the blending step, in a concentrator for the blended solution as shown in FIG. 2, or during evaporative crystallization of the blended solution.

As shown in FIGS. 1–3, the effluent filtrate is fed to a blender 8 which may be any suitable mixing vessel. Also fed to the blender is a calcium chlorate mother liquor recovered and recycled from the crystallizer for the crystalline calcium chlorate product. This mother liquor comprises an aqueous solution of calcium chlorate and calcium chloride having a $$\frac{CaClO_3}{CaCl_2}$$

weight ratio of greater than 1.0.

Blending of the filtrate with the calcium chlorate mother liquor provides a blended solution which comprises calcium chloride and calcium chlorate in a weight ratio of $$\frac{Ca(ClO_3)_2}{CaCl_2}$$

in the range of from about 0.15 to about 0.35.

The blended solution is fed to the first of a plurality of crystallizers. Where the desired calcium chloride hydrate is the dihydrate or tetrahydrate, the first crystallizer is an evaporator-crystallizer in which water is evaporated to concentrate the blended solution. When calcium chloride dihydrate is the desired product, the crystallizer is operated in the temperature range of from about 45° to about 75° C. as shown in FIG. 4. During the crystallization of calcium chloride, the solution is concentrated with respect to the calcium chlorate constituent.

In an alternate embodiment, following the separation of calcium chloride dihydrate crystals in the evaporative crystallizer, the mother liquor may be fed to a non-evaporative cooling crystallizer, as shown in FIG. 3, to recover additional crystals of calcium chloride dihydrate.

Following the separation of the calcium chloride dihydrate crystals in the evaporation crystallizer, the mother liquor recovered has a $Ca(ClO_3)_2/CaCl_2$ weight ratio of at least 1.2.

Where calcium chloride tetrahydrate crystals are the desired product, the process in the first evaporative crystallizer is similar to that for the dihydrate. The operating temperatures are in the range of from about 20° to about 45° C., and preferably from about 25° to about 35° C. Separation of the crystals of calcium chloride tetrahydrate provides a mother liquor which has a $Ca(ClO_3)_2/CaCl_2$ weight ratio of at least about 1.1.

While recovery of calcium chloride as the dihydrate is normally preferred to producing the tetrahydrate, if difficulty is experienced in growing acceptable dihydrate crystals, the production of calcium chloride tetrahydrate can be accomplished.

To produce calcium chloride hexahydrate crystals, the first crystallizer is a cooling crystallizer in which a minor amount of evaporative crystallization is allowable. Low operating temperatures are employed, that is temperatures of from about 0° to about 20° C., and preferably in the range of from about 0° to about 10° C. At these low temperatures, evaporative crystallization is uneconomical. Calcium chloride hexahydrate crystals are easily grown in the form of coarse, prismatic rods. Separation of the hexahydrate crystals provides a mother liquor having a $Ca(ClO_3)_2/CaCl_2$ weight ratio of at least about 1.3.

The mother liquor recovered from the crystallizer or crystallizers used in producing calcium chloride hydrates is fed to an evaporative crystallizer to produce calcium chlorate crystals. FIG. 3 shows that crystals of anhydrous calcium chlorate or calcium chlorate dihydrate may be produced. It is, however, preferable to recover crystals of anhydrous calcium chlorate. To produce anhydrous calcium chlorate, the evaporative crystallizer is operated at temperatures in the range of from about 50° to about 120° C. The crystalline anhydrous calcium chlorate is separated from a second mother liquor which is recycled to the blender to be mixed with additional filtrate effluent. The second mother liquor has a calcium chlorate/calcium chloride weight ratio of at least about 1.

The novel process of the present invention can be operated continuously to recover commercially valuable calcium compounds from effluents produced in the production of calcium hypochlorite. Calcium chlorate is employed in herbicide and defoliant compositions. The calcium chloride dihydrate and tetrahydrate produced can be employed as drying agents. The novel process further provides for the disposal of waste solutions in a manner which poses no pollution problems.

The process of the present invention is further illustrated by the following examples without any intention of being limited thereby.

EXAMPLE 1

A filtrate (1000 parts) is recovered from a calcium hypochlorite paste filter comprising an aqueous solution of calcium chloride (26.5 percent by weight) containing 1.5 percent by weight of calcium chlorate. The filtrate is blended in a mixing vessel with 191 parts of a calcium chlorate mother liquor containing 45 percent by weight of $Ca(ClO_3)_2$ and 35.6 percent $CaCl_2$. The blended solution is fed to an evaporative crystallizer and heated to about 45° C. to evaporate water and form a slurry of crystals of calcium chloride dihydrate, $CaCl_2.2H_2O$. Calcium chloride dihydrate crystals are separated from an aqueous mother liquor having a weight ratio of $Ca(ClO_3)_2$ to $CaCl_2$ of 1.48. The calcium chloride crystals are recovered and dried in a hot air dryer. The aqueous mother liquor is fed to a second evaporative crystallizer which heats the mother liquor to a temperature of about 100° C. to evaporate additional water. A slurry of calcium chlorate crystals is formed and the crystals separated from a calcium chlorate mother liquor. Crystalline anhydrous calcium chlorate is recovered from the crystallizer and dried. The mother liquor having a $Ca(ClO_3)_2/CaCl_2$ weight ratio of 1.26 is returned to the mixing vessel for blending with additional filtrate.

EXAMPLE 2

Using the apparatus of EXAMPLE 1, 1000 parts of a calcium hypochlorite process filtrate solution containing 26.5 percent by weight of $CaCl_2$ and 1.5 percent by weight of $Ca(ClO_3)_2$ [weight ratio of $Ca(ClO_3)_2/CaCl_2=0.05$] are fed to the mixing vessel and blended with 205 parts of a calcium chlorate liquor. The chlorate liquor contains 42 percent by weight of $Ca(ClO_3)_2$ and 40 percent by weight of $CaCl_2$. The blended solution is fed to an evaporative crystallizer maintained under vacuum at a temperature of about 40° C. Evaporation of water provided concentrations of 46.6 percent $CaCl_2$ and 13.6 percent $CaClO_3$ in the solution and crystallization of calcium chloride tetrahydrate, $CaCl_2.4H_2O$. During the crystal forming period, the slurry is cooled to a temperature of 10° C. to increase the $Ca(ClO_3)_2$ concentration. Calcium chloride tetrahydrate crystals were separated from a mother liquor 32.9 percent by weight of $Ca(ClO_3)_2$ and 26.7 percent by weight of $CaCl_2$. The mother liquor is fed to an evaporative crytallizer which concentrates the solution by evaporating water to provide the mother liquor with a weight ratio of $Ca(ClO_3)_2$ to $CaCl_2$ of 1.2. Crystallization of $CaClO_3$ takes place and the crystals are separated from a calcium chlorate liquor containing 42 percent by weight of $Ca(ClO_3)_2$ and 40 percent by weight of $CaCl_2$. The calcium chlorate liquor is recycled to the mixing vessel.

EXAMPLE 3

An aqueous filtrate (1000 parts) containing 26.5 percent $CaCl_2$ and 1.5 percent $Ca(ClO_3)_2$ and minor amounts of $Ca(OCl)_2$ is recovered from a calcium hypochlorite paste filter and fed to a mixing vessel. Also fed to a heated mixing vessel are 96 parts of a calcium chlorate liquor containing 47 percent by weight of $Ca(OCl_3)_2$ and 33.5 percent by weight of $CaCl_2$ [$Ca(ClO_3)_2/CaCl_2$ weight ratio=1.4]. The solutions are mixed and heated to convert the $Ca(OCl)_2$ to calcium chlorate and provided a blended solution containing 27.3 percent $CaCl_2$, 5.5 percent $Ca(ClO_3)_2$ and 67.2 percent $H_2O$. The blended solution is fed to an evaporator and the water content reduced about 20 percent by weight. The concentrated solution is fed to an evaporative cooling crystallizer operated at 20° C. to produce a slurry of calcium chloride hexahydrate crystals in a mother liquor. After separation, the mother liquor is fed to a second crystallizer which is cooled by refrigeration to maintain the liquor at 5° C. Additional $CaCl_2.6H_2O$ crystals are formed and separated from a mother liquor containing 37 percent $Ca(ClO_3)_2$ and 20 percent $CaCl_2$. The mother liquor is fed to an evaporative crystallizer where $Ca(ClO_3)_2$ crystals are formed and recovered by the process of Example 1. After separating the anhydrous calcium chlorate crystals, the calcium chlorate liquor containing 47 percent $Ca(ClO_3)_2$ and 33.5 percent $CaCl_2$ is recycled to the mixing vessel.

EXAMPLE 4

The aqueous filtrate (1000 parts) from a calcium hypochlorite paste filter containing 26.5 percent $CaCl_2$, 1.5 percent $Ca(ClO_3)_2$ and minor amounts of $Ca(OCl)_2$ is fed to a heated mixing vessel in which the filtrate is blended with 96 parts of a calcium chlorate containing 45 percent $Ca(ClO_3)_2$ and 32 percent $CaCl_2$. During mixing, the solution is heated to its atmospheric boiling point to convert the calcium hypochlorite present to $Ca(ClO_3)_2$ and the blended solution fed to an evaporative crystallizer. The solution is evaporatively cooled to a temperature of about 40° C. to produce crystals of calcium chloride tetrahydrate, $CaCl_2.4H_2O$. The crystals were separated from a liquor containing about 33 percent $CaCl_2$, 32 percent $Ca(ClO_3)_2$ and 37 percent $H_2O$. The calcium chloride tetrahydrate crystals were recovered. The liquor from the evaporative crystallizer was diluted with water to provide a solution containing about 28 percent $CaCl_2$, 27 percent $Ca(ClO_3)_2$ and 45 percent water which was fed to a cooling crystallizer. The crystallizer, cooled by refrigeration, maintained the solution at a temperature of about 10° C. Crystals of calcium chloride hexahydrate are formed and separated from a mother liquor containing 37 percent $Ca(ClO_3)_2$ and 20 percent $CaCl_2$. The mother liquor is fed to an evaporative crystallizer for the formation and recovery of anhydrous $Ca(ClO_3)_2$ crystals from a calcium chlorate liquor by the process of Example 1. The calcium chlorate mother liquor having a weight ratio of $Ca(ClO_3)_2$ to $CaCl_2$ of 1.40 is recycled to the mixing vessel.

What is claimed is:

1. A process for the recovery of calcium chloride hydrates and anhydrous calcium chlorate from calcium hypochlorite process effluents which comprises:
   (a) neutralizing said calcium hypochlorite process effluent by the addition of an acid to form a neutralized effluent comprised of an aqueous solution of calcium chloride, calcium chlorate, and calcium hypochlorite and having a weight ratio of $Ca(ClO_3)_2/CaCl_2$ of less than about 0.2;
   (b) blending said neutralized effluent with a second mother liquor comprised of an aqueous solution of calcium chlorate and calcium chloride and having a weight ratio of $Ca(ClO_3)_2/CaCl_2$ of greater than about 1.0, to form a blended solution;
   (c) feeding said blended solution to a first crystallizer to form a slurry of calcium chloride hydrate in a first mother liquor;
   (d) separating said crystals of said calcium chloride hydrate from said first mother liquor, said first mother liquor having a weight ratio of $Ca(ClO_3)_2/CaCl_2$ of at least about 1.0;
   (e) feeding said first mother liquor to an evaporative crystallizer to form a crystalline anhydrous calcium chlorate compound;
   (f) separating said crystalline anhydrous calcium chlorate compound from a second mother liquor;
   (g) recovering said crystalline anhydrous calcium chlorate compound; and
   (h) returning said second mother liquor to step (b).

2. The process of claim 1 in which said calcium chloride hydrate is selected from the group consisting of calcium chloride dihydrate, calcium chloride tetrahydrate, calcium chloride hexahydrate, and mixtures thereof.

3. The process of claim 1 in which said first crystallizer is an evaporative crystallizer and said calcium chloride hydrate is calcium chloride dihydrate.

4. The process of claim 1 in which said first crystallizer is an evaporative crystallizer and said calcium chloride hydrate is calcium chloride tetrahydrate.

5. The process of claim 1 in which prior to step (c) said blended solution is heated to evaporate water and decompose said calcium hypochlorite.

6. The process of claim 5 in which said first crystallizer is a cooling crystallizer, crystals of said calcium chloride hydrate are formed and said crystals separated from a saturated calcium chloride solution.

7. The process of claim 6 in which said saturated calcium chloride solution is fed to a second cooling crystallizer, crystals of calcium chloride hydrate are formed and said crystals separated from said first mother liquor.

8. The process of claim 1 in which following step (d) and prior to step (e) said first mother liquor is fed to a cooling crystallizer.

9. The process of claim 6 or claim 8 in which said calcium chloride hydrate is selected from the group consisting of calcium chloride dihydrate, calcium chloride tetrahydrate, and calcium chloride hexahydrate.

10. The process of claim 7 in which said calcium chloride hydrate is calcium chloride hexahydrate.

11. The process of claim 3 in which said first crystallizer is maintained at a temperature in the range of from about 45° to about 75° C.

12. The process of claim 10 in which said second cooling crystallizer is maintained at a temperature in the range of from about 0° to about 20° C.

* * * * *